(12) United States Patent
Rathinasamy et al.

(10) Patent No.: US 12,470,125 B2
(45) Date of Patent: Nov. 11, 2025

(54) CONFIGURABLE AC INPUT/DC INPUT POWER SUPPLY SYSTEM

(71) Applicant: Dell Products L.P., Round Rock, TX (US)

(72) Inventors: Shree Rathinasamy, Round Rock, TX (US); Maunish Shah, Austin, TX (US); Per Henrik Fremrot, Novato, CA (US)

(73) Assignee: Dell Products L.P., Round Rock, TX (US)

( * ) Notice: Subject to any disclaimer, the term of this patent is extended or adjusted under 35 U.S.C. 154(b) by 323 days.

(21) Appl. No.: 17/752,608

(22) Filed: May 24, 2022

(65) Prior Publication Data

US 2023/0387786 A1    Nov. 30, 2023

(51) Int. Cl.
*H02M 1/10*    (2006.01)
*H02M 1/42*    (2007.01)
*H02M 3/06*    (2006.01)
*H02M 7/04*    (2006.01)

(52) U.S. Cl.
CPC ........... *H02M 1/10* (2013.01); *H02M 1/4233* (2013.01); *H02M 3/06* (2013.01); *H02M 7/05* (2021.05)

(58) Field of Classification Search
CPC ...... H02M 1/10; H02M 1/0067; H02M 1/007; H02M 1/0083; H02M 1/32; H02M 1/42; H02M 1/4208; H02M 1/4216; H02M 1/4225; H02M 1/4233; H02M 1/4241; H02M 1/4258; H02M 1/4283; H02M 3/02; H02M 3/04; H02M 3/06; H02M 3/135; H02M 3/137; H02M 3/155; H02M 3/156; H02M 3/158; H02M 3/1584; H02M 7/02; H02M 7/04; H02M 7/05; H02M 7/155; G06F 1/26–3296
USPC .................. 363/50–58, 65, 67–72, 123–127, 363/131–134, 142, 144, 146; 323/266, 323/176, 282, 351; 713/300–340; 307/64, 65, 80
See application file for complete search history.

(56) References Cited

U.S. PATENT DOCUMENTS 7,190,091 B1 *    3/2007    Marshall .................. H02M 1/10
                                                                 307/26
10,601,306 B1 *    3/2020    Yu ...................... H02M 3/33523
(Continued)

*Primary Examiner* — Thienvu V Tran
*Assistant Examiner* — Carlos O Rivera-Perez
(74) *Attorney, Agent, or Firm* — Joseph Mencher

(57) ABSTRACT

A power supply system includes an AC input device/DC input device connector having an AC input device sub-connector and a DC input device sub-connector, an AC power supply subsystem configured to perform first power operation(s) on first power received from the AC input device sub-connector, and a DC power supply subsystem configured to perform second power operation(s) on second power received from the DC input device sub-connector. When an AC input device is coupled to the AC input device sub-connector, an AC-or-DC power supply subsystem in the power supply system performs third power operation(s) on the first power received from the AC power supply subsystem, and supplies it to component(s). When the DC input device is coupled to the DC input device sub-connector, the AC-or-DC power supply subsystem performs the third power operation(s) on the second power received from the DC power supply subsystem, and supplies it to component (s).

20 Claims, 17 Drawing Sheets

(56) References Cited

U.S. PATENT DOCUMENTS

| | | | |
|---|---|---|---|
| 2008/0231233 A1* | 9/2008 | Thornton | H02J 7/0042 320/137 |
| 2010/0066329 A1* | 3/2010 | Chiu | H02M 3/156 323/282 |
| 2013/0191674 A1* | 7/2013 | Sultenfuss | G06F 1/3253 713/340 |
| 2017/0005494 A1* | 1/2017 | Li | H02J 7/0013 |

* cited by examiner

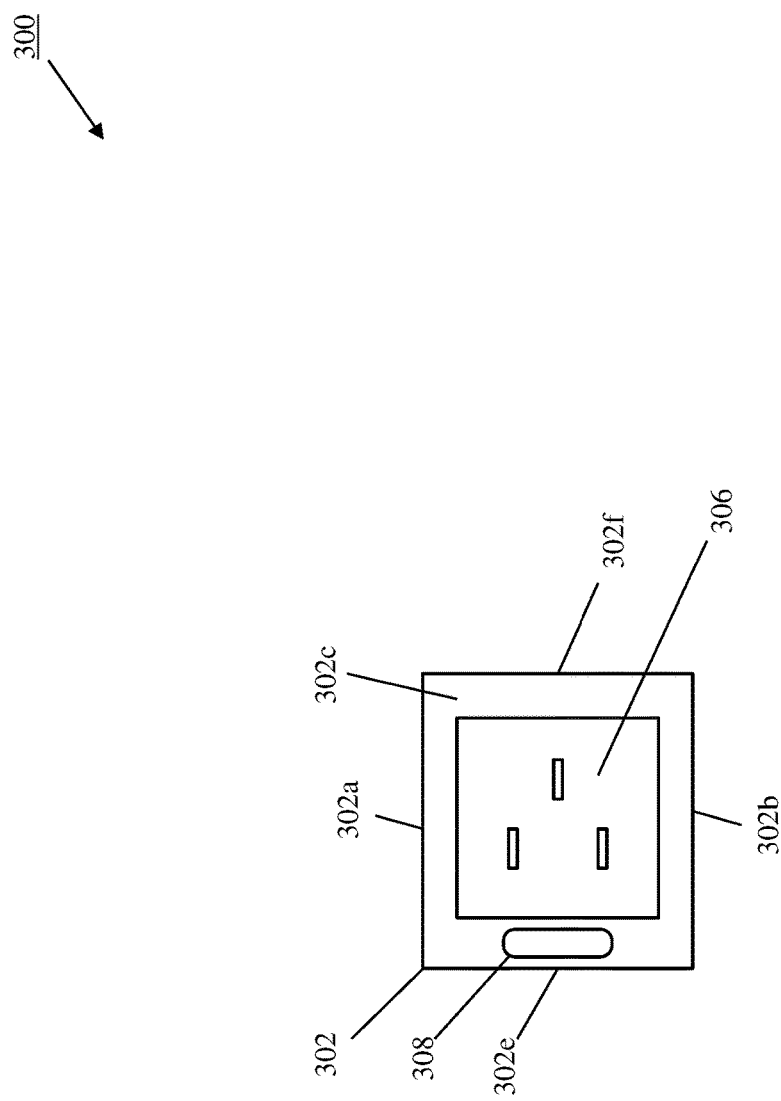

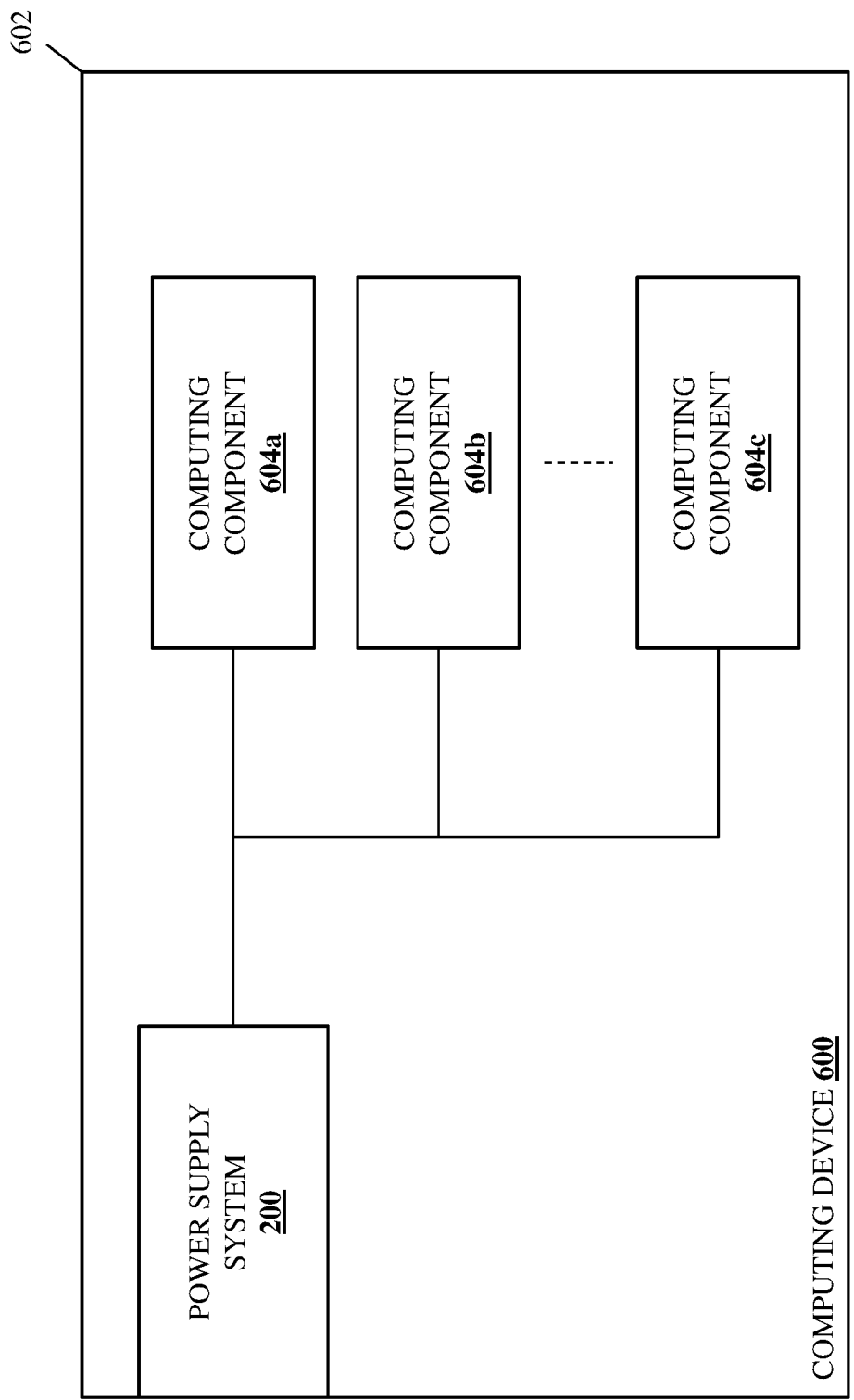

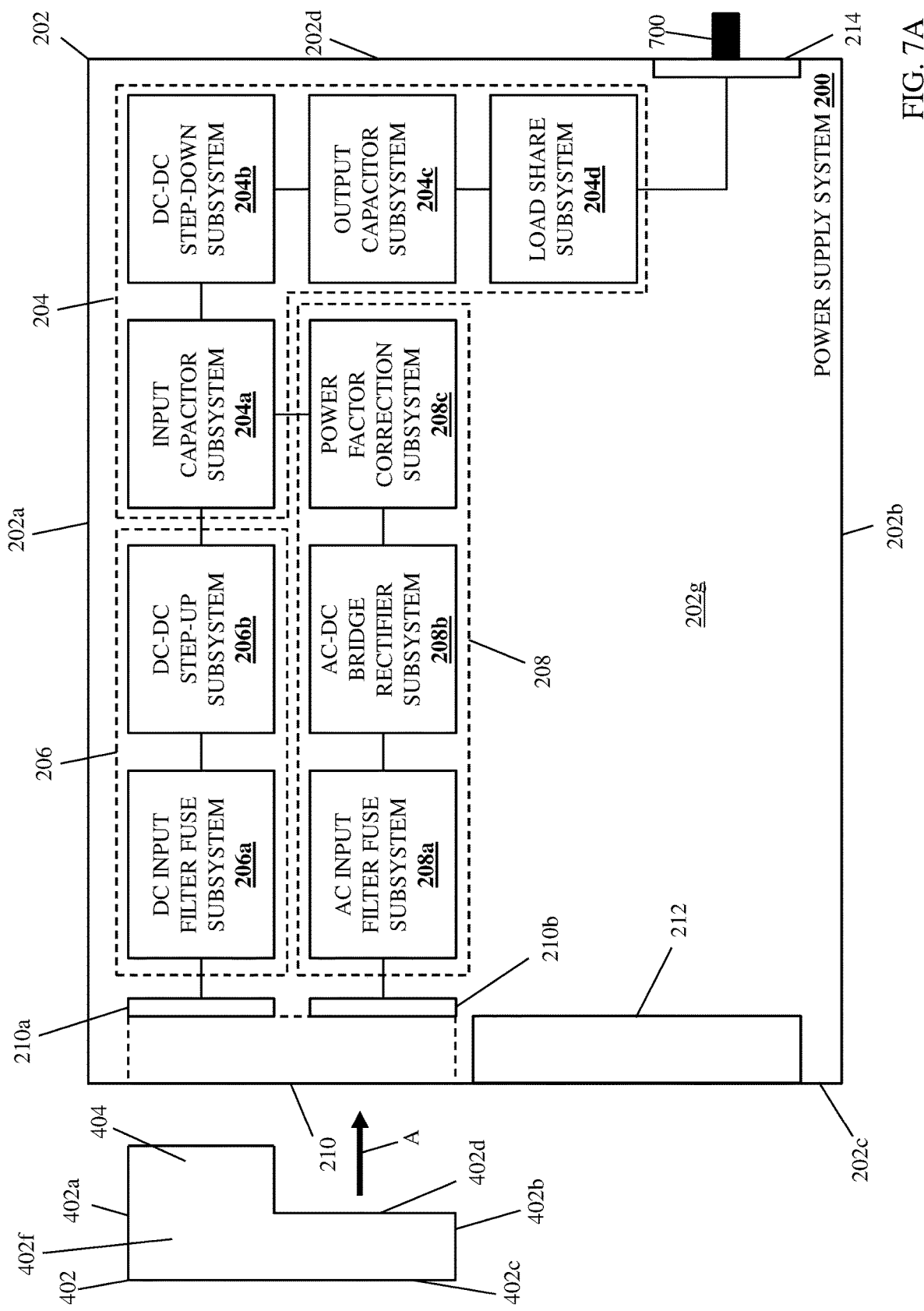

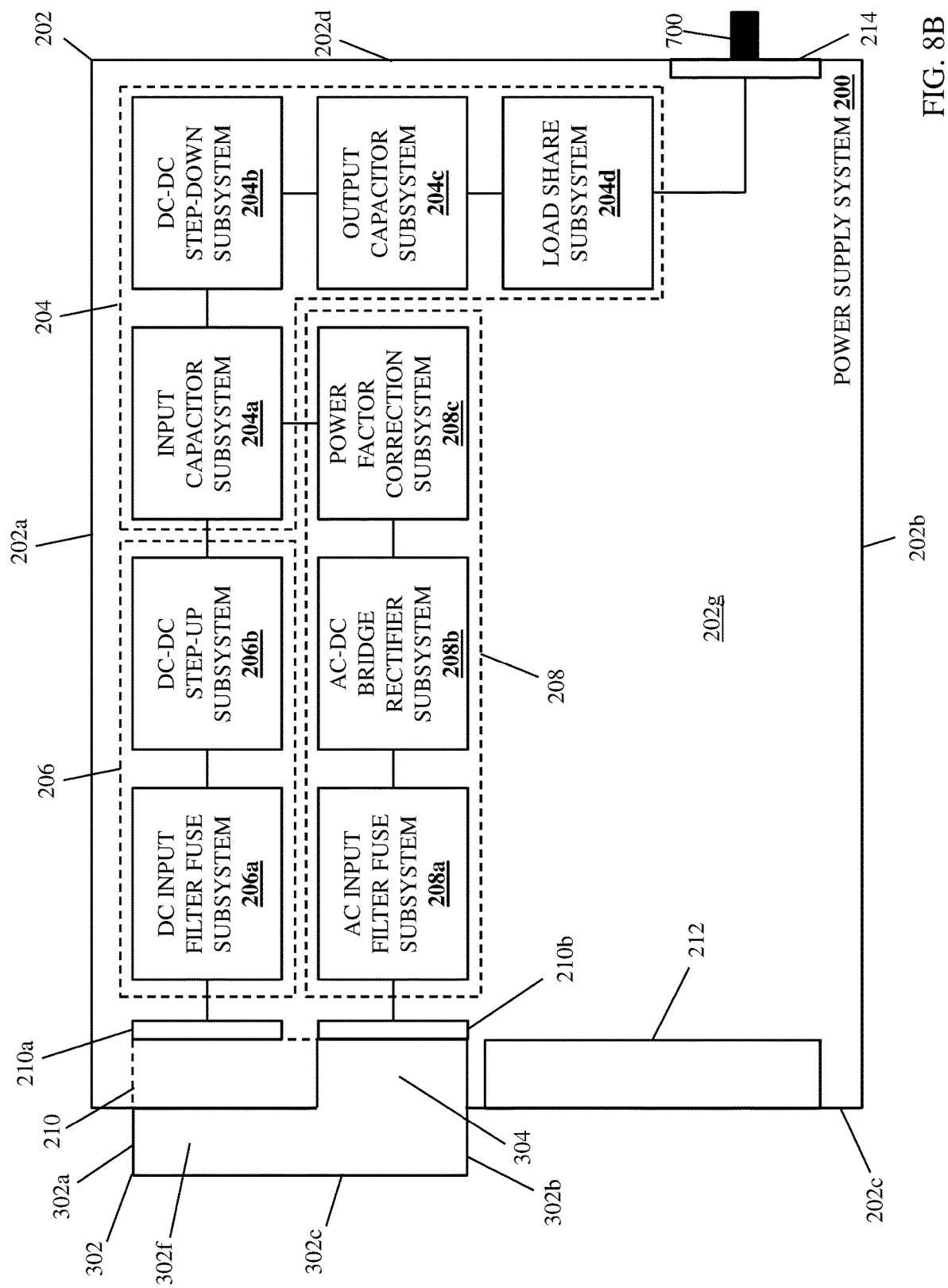

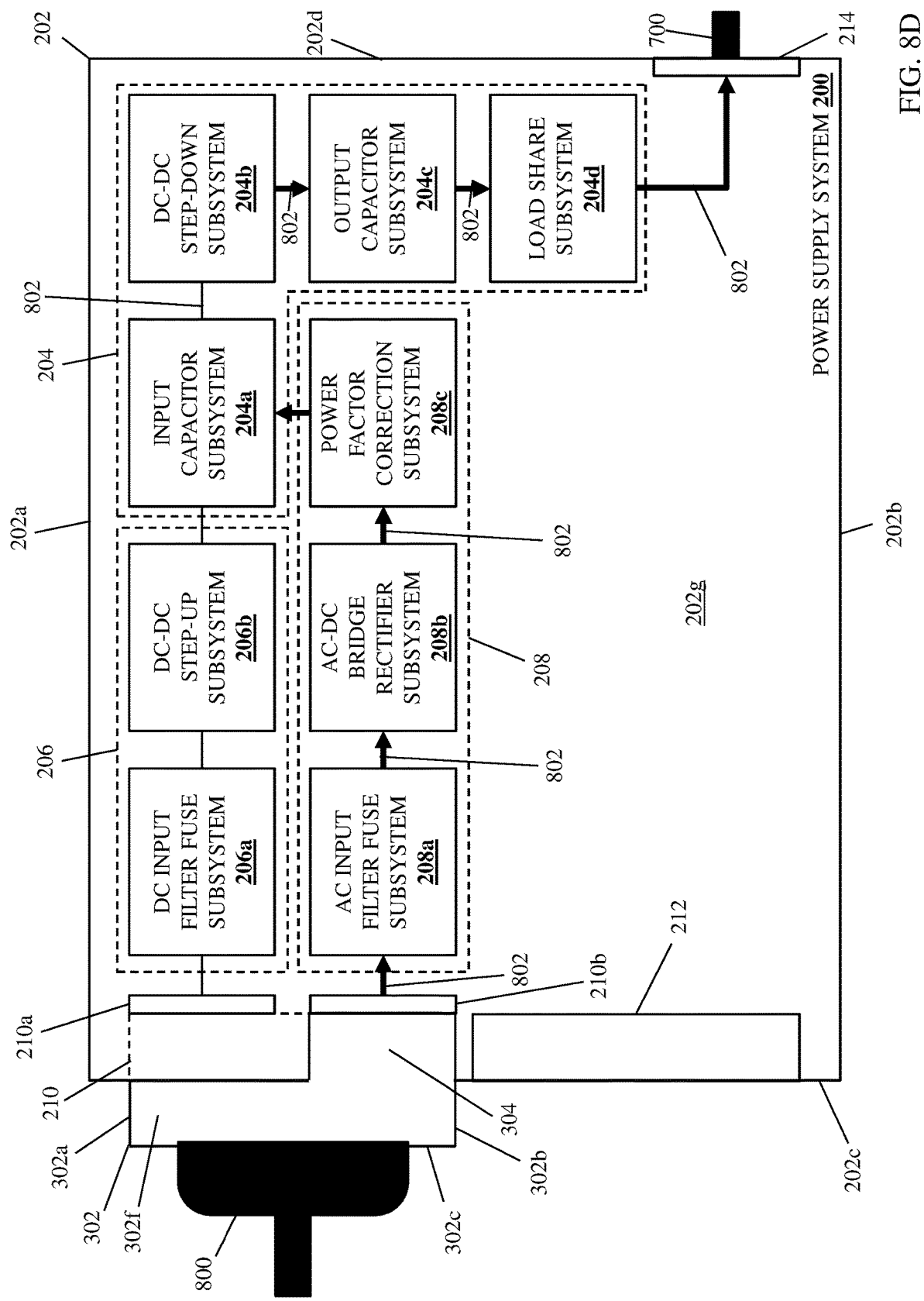

CONFIGURABLE AC INPUT/DC INPUT POWER SUPPLY SYSTEM

BACKGROUND

The present disclosure relates generally to information handling systems, and more particularly to providing a power supply system that is configurable to receive either an AC power input or a DC power input and output power to an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems including, for example, networking devices such as switch devices, include power supply systems for receiving power from a power source (e.g., a wall outlet) and providing that power to components in the networking device. For example, Power Supply Unit (PSU) devices typically include either an Alternating Current (AC) power input for receiving power from an AC power source (e.g., an AC power wall outlet) along with associated components for providing that AC power to components in the networking device, or a Direct Current (DC) power input for receiving power from a DC power source (e.g., a DC-48V power distribution system) along with associated components for providing that DC power to components in the networking device. As will be appreciated by one of skill in the art, a PSU device having a power input that differs from the power source (e.g., the wall outlet) will not be able to receive power from that power source due to the lack of ability to connect that power source to that power input.

As such, in the event a user receives a PSU device with a power input that differs from available power source(s), they will need to replace that PSU device with a PSU device with a power input that matches an available power source, delaying their ability to utilize the networking device. To provide a specific example, most modern datacenters include AC power sources (e.g., AC power wall outlets) that are configured to connect to AC power inputs on PSU devices, and thus the issues discussed above will occur when a PSU device with a DC power input is ordered to those datacenters. Similarly, many Telephone Company (TelCo) central offices include DC power sources (e.g., DC-48V power distribution systems) that are configured to connect to DC power inputs on PSU devices, and thus the issues discussed above will occur when a PSU device with an AC power input is ordered to those TelCo central offices. Furthermore, PSU device manufacturers must manufacture and stock both AC-capable PSU devices with AC power inputs, and DC-capable PSU devices with DC power inputs, thus increasing manufacturing costs and storage costs.

Accordingly, it would be desirable to provide a power supply system that addresses the issues discussed above.

SUMMARY

According to one embodiment, an Information Handling System (IHS) includes a chassis; a processing system that is housed in the chassis; a memory system that is housed in the chassis, that is coupled to the processing system, and that includes instructions that, when executed by the processing system, cause the processing system to provide an Information Handling System (IHS) engine; and a power supply system that is housed in the chassis and that is coupled to the processing system and the memory system, wherein the power supply system includes: an Alternating Current (AC) input device/Direct Current (DC) input device connector that includes an AC input device sub-connector that is configured to couple to an AC input device, and a DC input device sub-connector that is configured to couple to a DC input device; an AC power supply subsystem that is configured to receive first power from the AC input device sub-connector and perform at least one first power operation on the first power; a DC power supply subsystem that is configured to receive second power from the DC input device sub-connector and perform at least one second power operation on the second power; and an AC-or-DC power supply subsystem that is configured to: receive, when the AC input device is coupled to the AC input device sub-connector, the first power from the AC power supply subsystem, perform at least one third power operation on the first power, and supply the first power for use in powering the processing system and the memory system; and receive, when the DC input device is coupled to the DC input device sub-connector, the second power from the DC power supply subsystem, perform the at least one third power operation on the second power, and supply the second power for use in powering the processing system and the memory system.

BRIEF DESCRIPTION OF THE DRAWINGS

FIG. 3A is a schematic front view illustrating an embodiment of an AC input device that may be utilized with the power supply system of FIGS. 2A and 2B.

FIG. 6 is a schematic view illustrating an embodiment of the power supply system of FIGS. 2A and 2B provided in a networking device during the method of FIG. 5.

FIG. 7A is a schematic top view illustrating an embodiment of the DC input device of FIGS. 4A and 4B being coupled to the power supply system of FIGS. 2A and 2B during the method of FIG. 5.

FIG. 8B is a schematic top view illustrating an embodiment of the AC input device of FIGS. 3A and 3B coupled to the power supply system of FIGS. 2A and 2B during the method of FIG. 5.

FIG. 8D is a schematic top view illustrating an embodiment of the power supply system of FIG. 8B performing power supply operations during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
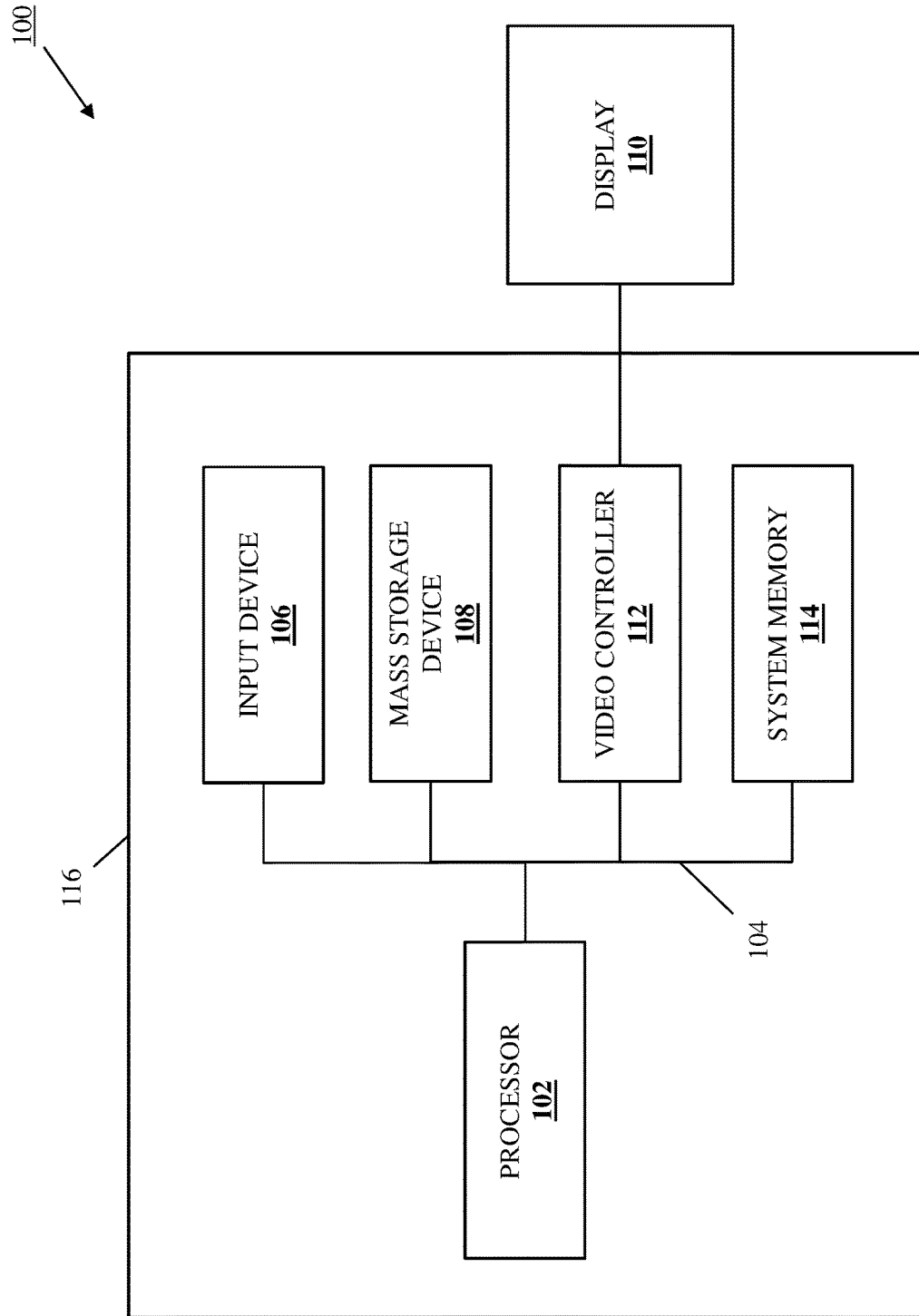
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
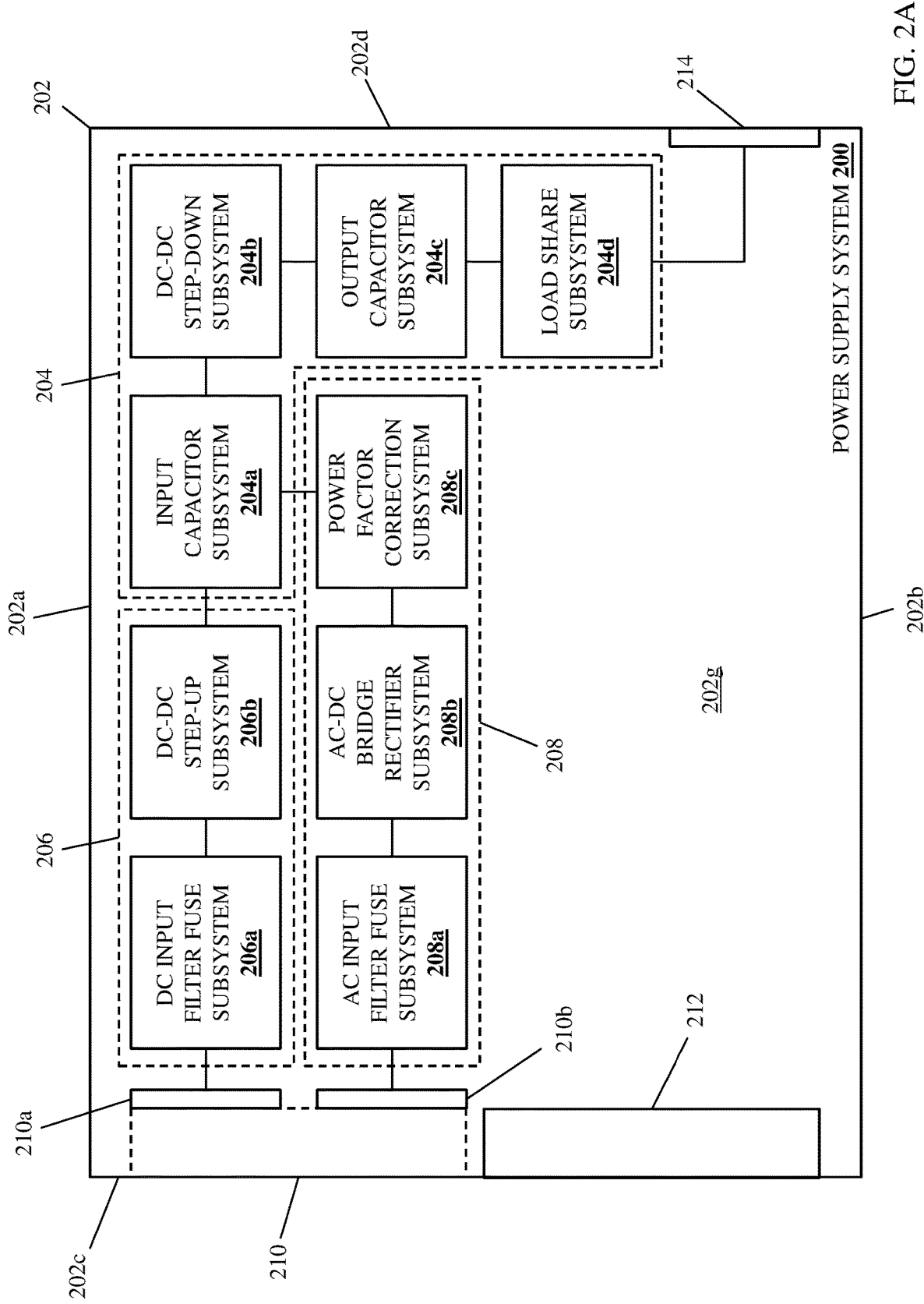
FIG. 2A is a schematic top/internal view illustrating an embodiment of a power supply system provided according to the teachings of the present disclosure.
Figure 2B:
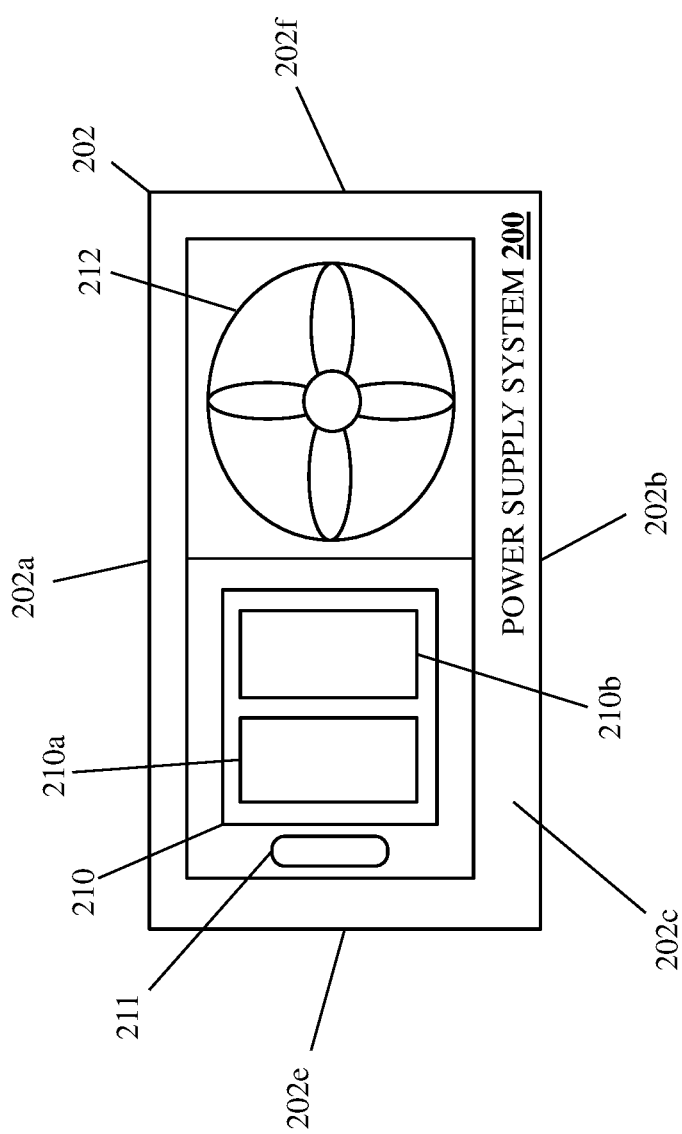
FIG. 2B is a schematic front view illustrating an embodiment of the power supply system of FIG. 2A.

Referring now to FIGS. 2A and 2B, an embodiment of a power supply system 200 is illustrated that may provide the configurable AC input/DC input power supply system of the present disclosure. As discussed below, in some embodiments the power supply system 200 may be configured to be provided by the IHS 100 discussed above with reference to FIG. 1 in order to provide power to some or all of the components of the IHS 100, and in specific examples may be provided by a Power Supply Unit (PSU) device. However, while illustrated and discussed as being provided by a PSU device that is configured to be provided in an IHS, one of skill in the art in possession of the present disclosure will recognize that the configurable AC input/DC input power supply system of the present disclosure may be provided by other devices that may be configured to provide power to other systems/components while remaining within the scope of the present disclosure as well.

In the illustrated embodiment, the power supply system 200 includes a chassis 202 that houses the components of the power supply system 200, only some of which are illustrated and discussed below. As illustrated, the chassis 202 may include a top surface 202a, a bottom surface 202b that is located opposite the chassis 202 from the top surface 202a, a front surface 202c that extends between the top surface 202a and the bottom surface 202b, a rear surface 202d that extends between the top surface 202a and the bottom surface 202b and that is located opposite the chassis 202 from the front surface 202c, and a pair of side surfaces 202e and 202f that extend between the top surface 202a, the bottom surface 202b, the front surface 202c, and the rear surface 202d, and that are located opposite the chassis 202 from each other. Furthermore, the chassis 202 may define a chassis housing 202g between the top surface 202a, the bottom surface 202b, the front surface 202c, the rear surface 202d, and the side surfaces 202e and 202f.

As illustrated in FIG. 2A, the chassis 202 may house an AC-or-DC power supply subsystem 204 that, in the illustrated embodiment, includes an input capacitor subsystem 204a that one of skill in the art in possession of the present disclosure will appreciate may be configured to perform power storage/provisioning operations and/or other input capacitor operations known in the art. The AC-or-DC power supply subsystem 204 also includes a DC-DC step-down subsystem 204b that is connected to and configured to receive power from the input capacitor subsystem 204a, and that one of skill in the art in possession of the present disclosure will appreciate may be configured to perform DC voltage step-down operations that "step-down" or otherwise reduce a DC voltage of power received from the input capacitor subsystem 204a, and/or to perform other DC-DC step-down operations known in the art. The AC-or-DC power supply subsystem 204 also includes an output capacitor subsystem 204c that is connected to and configured to receive power from the DC-DC step-down subsystem 204b, and that one of skill in the art in possession of the present disclosure will appreciate may be configured to perform power storage/provisioning operations and/or other output capacitor operations known in the art. The AC-or-DC power supply subsystem 204 also includes a load share subsystem 204d that is connected to and configured to receive power from the output capacitor subsystem 204c, and that one of skill in the art in possession of the present disclosure will appreciate may be configured to perform load share operations that allow a power load (e.g., from an IHS and/or components in that IHS) to be shared with another power supply system, and/or to perform other load share operations known in the art.

However, while a specific AC-or-DC power supply subsystem 204 is illustrated and described, one of skill in the art in possession of the present disclosure will appreciate how AC-or-DC power supply subsystems provided according to the teachings of the present disclosure may not include some of the components illustrated in FIG. 2A, or may include components not illustrated in FIG. 2A, while remaining within the scope of the present disclosure as well. For example, as discussed above the load share subsystem 204d may be configured to perform load share operations that allow a power load (e.g., from an IHS and/or components in that IHS) to be shared with another power supply system, and thus for power supply systems that are configured to be the only power supply system utilized (e.g., by an IHS and/or components of an IHS), the load share subsystem 204d may be omitted.

As illustrated in FIG. 2A, the chassis 202 may also house a DC power supply subsystem 206 that, in the illustrated embodiment, includes a DC input filter fuse subsystem 206a that one of skill in the art in possession of the present disclosure will appreciate may be configured to perform DC input filter fuse operations that prevent power with DC voltages above a threshold from reaching other components of the power supply system 200, and/or to perform other DC input filter fuse operations known in the art. To provide a specific example, the power supply system 200 may be configured to receive power with DC voltages from a DC power source (e.g., a DC-48V power distribution system) in the range of 48-60 volts (e.g., Safety Extra Low Voltage (SELV) DC voltages), and the DC input filter fuse subsystem 206a may include fuse device(s) and/or other components that are configured to protect the components of the power supply system 200 if an input current exceeds a threshold due to a fault condition. However, while specific DC voltages are described above, one of skill in the art in possession of the present disclosure will recognize how the DC input filter fuse subsystem 206a may be configured to perform DC filter fuse operations for power with other DC voltages while remaining within the scope of the present disclosure as well.

The DC power supply subsystem 206 also includes a DC-DC step-up subsystem 206b that is connected to and configured to receive power from the DC input filter fuse subsystem 206a, and that one of skill in the art in possession of the present disclosure will appreciate may be configured to perform DC-DC step-up operations that "step-up" or otherwise increase a DC voltage of power received from the DC input filter fuse subsystem 206a. To provide a specific example, the AC-or-DC power supply subsystem 204 in the power supply system 200 may be configured to operate on power with DC voltages of approximately 400 volts, and the DC-DC step-up subsystem 206b may include components that are configured to receive the power with the DC voltage of 48-60 volts discussed above, and perform DC voltage step-up operations that "step-up" or otherwise increase the DC voltage of that power to 400 volts. However, while the increasing of power to specific DC voltages is described above, one of skill in the art in possession of the present disclosure will recognize how the DC-DC step-up subsystem 206b may be configured to perform DC-DC step-up operations to receive power at other DC voltages and increase the DC voltage of that power to other levels while remaining within the scope of the present disclosure as well.

FIG. 2A also illustrates how the DC-DC step-up subsystem 206b in the DC power supply subsystem 206 is connected to the input capacitor subsystem 204a in the AC-or-DC power supply subsystem 204 such that the DC-DC step-up subsystem 206b is configured to provide power to the input capacitor subsystem 204a. However, while a specific DC power supply subsystem 206 is illustrated and described, one of skill in the art in possession of the present disclosure will appreciate how DC power supply subsystems provided according to the teachings of the present disclosure may not include some of the components illustrated in FIG. 2A, or may include components not illustrated in FIG. 2A, while remaining within the scope of the present disclosure as well.

As illustrated in FIG. 2A, the chassis 202 may also house an AC power supply subsystem 208 that, in the illustrated embodiment, includes an AC input filter fuse subsystem 208a that one of skill in the art in possession of the present disclosure will appreciate may be configured to perform AC input filter fuse operations that protect the components of the power supply system 200 if an input current exceeds a threshold due to a fault condition, and/or to perform other AC input filter fuse operations known in the art. To provide a specific example, the power supply system 200 may be configured to receive power with AC voltages from an AC power source (e.g., an AC power wall outlet) in the range of 90-140 volts, and the AC input filter fuse subsystem 208a may include fuse device(s) and/or other components that are configured to protect the components of the power supply system 200 if an input current exceeds a threshold due to a fault condition. However, while specific AC voltages are described above, one of skill in the art in possession of the present disclosure will recognize how the AC input filter fuse subsystem 208a may be configured to perform AC filter fuse operations for power with other AC voltages while remaining within the scope of the present disclosure as well.

The AC power supply subsystem 208 also includes an AC-DC bridge rectifier subsystem 208b that is connected to and configured to receive power from the AC input filter fuse subsystem 208a, and that one of skill in the art in possession of the present disclosure will appreciate may be configured to perform AC-DC bridge rectifier operations that convert power received from the AC input filter fuse subsystem 208a and having an AC voltage to power having a DC voltage, and/or to perform other AC-DC bridge rectifier operations known in the art. To provide a specific example, the AC-DC bridge rectifier subsystem 208b may include a plurality of diode devices that are configured to receive power with an AC voltage from the AC input filter fuse subsystem 208a, and convert that power such that is has a DC voltage.

However, while a specific AC-to-DC voltage conversion technique is described, one of skill in the art in possession of the present disclosure will appreciate how other AC-to-DC voltage conversion technique will fall within the scope of the present disclosure as well.

The AC power supply subsystem 208 also includes a power factor correction subsystem 208c that is connected to and configured to receive power from the AC-DC bridge rectifier subsystem 208b, and that one of skill in the art in possession of the present disclosure will appreciate may be configured to perform power factor correction operations that ensure that the power output from the power factor correction subsystem 208c has a voltage and a current that in phase, and/or to perform other power factor correction operations known in the art. FIG. 2A also illustrates how the power factor correction subsystem 208c in the AC power supply subsystem 208 is connected to the input capacitor subsystem 204a in the AC-or-DC power supply subsystem 204 such that the power factor correction subsystem 208c is configured to provide power to the input capacitor subsystem 204a. However, while a specific AC power supply subsystem 208 is illustrated and described, one of skill in the art in possession of the present disclosure will appreciate how AC power supply subsystems provided according to the teachings of the present disclosure may not include some of the components illustrated in FIG. 2A, or may include components not illustrated in FIG. 2A, while remaining within the scope of the present disclosure as well. For example, as discussed above the power factor correction subsystem 208c may be configured to ensure that the power drawn from the power factor correction subsystem 208c has a voltage and a current that are in phase and meet power factor requirements, and thus for power supply systems that are configured such that the voltage and the current output from the AC-DC bridge rectifier subsystem 208b already meet power factor requirements, the power factor correction subsystem 208c may be omitted.

In the illustrated embodiment, an AC input device/DC input device connector 210 is included in the chassis 202 and accessible via the front surface 202c of the chassis 202. In an embodiment, the AC input device/DC input device connector 210 may be provided by an EXTREME TEN60® connector available from MOLEX® Electronic Solutions of Lisle, Illinois, United States, and/or other connectors that one of skill in the art in possession of the present disclosure will appreciate may couple to each of the AC input device and DC input device described below. The AC input device/DC input device connector 210 includes a DC input device sub-connector 210a that, as discussed below, is configured to couple to a DC input device, and that is connected to the DC input filter fuse subsystem 206a such that it may provide power received via the DC input device to the DC input filter fuse subsystem 206a. The AC input device/DC input device connector 210 also includes an AC input device sub-connector 210b that, as discussed below, is configured to couple to an AC input device, and that is connected to the AC input filter fuse subsystem 208a such that it may provide power received via the AC input device to the AC input filter fuse subsystem 208a.

However, while the DC input device sub-connector 210a and the AC input device sub-connector 210b on the AC input device/DC input device connector 210 are illustrated and described herein as physically separate sub-connectors that are spaced apart from each other on the AC input device/DC input device connector 210 and accessible on separate portions of the AC input device/DC input device connector 210 (e.g., with the DC input device sub-connector 210a accessible on a "left" portion of the AC input device/DC input device connector 210 as viewed in FIG. 2B, and with the AC input device sub-connector 210b accessible on a "right" portion of the AC input device/DC input device connector 210 as viewed in FIG. 2B), one of skill in the art in possession of the present disclosure will appreciate that other configurations of the DC input device sub-connector 210a and the AC input device sub-connector 210b on the AC input device/DC input device connector 210 will fall within the scope of the present disclosure as well. For example, the DC input device sub-connector 210a and the AC input device sub-connector 210b may be integrated on the same portion of the AC input device/DC input device connector 210 such that they are accessible on that portion of the AC input device/DC input device connector 210 (e.g., via a first set of pins, slots, or other connector elements on that portion of the AC input device/DC input device connector 210 that provides the DC input device sub-connector 210a that have a configuration that allows connection to a DC input device, and a second set of pins, slots, or other connector elements on that portion of the AC input device/DC input device connector 210 that provides the AC input device sub-connector 210b that have a configuration that allows connection to an AC input device).

While not explicitly illustrated, one of skill in the art in possession of the present disclosure will appreciate how the AC input device/DC input device connector 210, the DC input device sub-connector 210a, and/or the AC input device sub-connector 210b may include coupling, securing, and release features in order to allow the AC input device and DC input device discussed below to be connected to and disconnected from the AC input device/DC input device connector 210. For example, in the embodiment illustrated in FIG. 2B, an input device release member 211 is illustrated that may be coupled to the AC input device/DC input device connector 210, the DC input device sub-connector 210a, and/or the AC input device sub-connector 210b, and as discussed below the input device release member 211 may be actuated to release an AC input device from the AC input device/DC input device connector 210 and/or the AC input device sub-connector 210b after their connection, as well as release a DC input device from the AC input device/DC input device connector 210 and/or the DC input device sub-connector 210a after their connection.

In the illustrated embodiment, a fan system 212 is also included in the chassis 202 adjacent the front surface 202c and the AC input device/DC input device connector 210, and one of skill in the art in possession of the present disclosure will appreciate how the fan system 212 may be configured to produce an airflow through the chassis housing 202g of the chassis 202 in order to cool the components of the power supply system 200. Furthermore, a device/component connector 214 is included in the chassis 202 and accessible on the rear surface 202d of the chassis 202, and the device/component connector 214 is connected to the load share subsystem 204 in the AC-or-DC power supply subsystem 204 such that it is configured to receive power from the load share subsystem 204d and provide that power to devices/components that have been connected or coupled to the device/component connector 214. However, while a specific power supply system 200 has been illustrated and described, one of skill in the art in possession of the present disclosure will appreciate how the configurable AC input/DC input power supply system of the present disclosure may be provided using a variety of components and/or component configurations while remaining within the scope of the present disclosure as well.

Figure 3B:
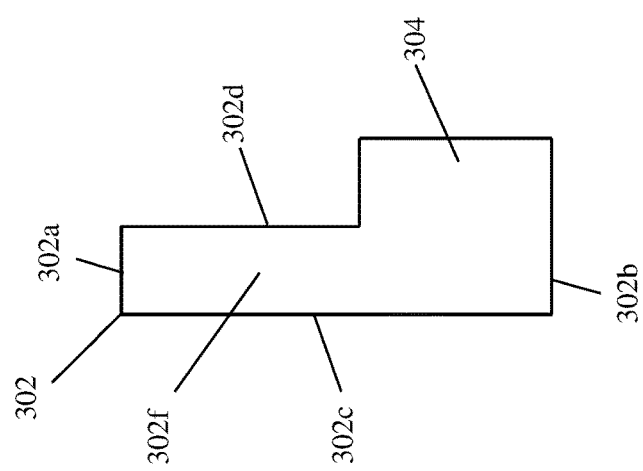
FIG. 3B is a schematic top view illustrating an embodiment of the AC input device of FIG. 3A.

With reference to FIGS. 3A and 3B, an embodiment of an AC input device 300 is illustrated that may be utilized with the power supply system 200 discussed above with reference to FIGS. 2A and 2B. In the illustrated embodiment, the AC input device 300 includes a chassis 302 that houses the components of the AC input device 300, only some of which are illustrated and discussed below. As illustrated, the chassis 302 may include a top surface 302a, a bottom surface 302b that is located opposite the chassis 302 from the top surface 302a, a front surface 302c that extends between the top surface 302a and the bottom surface 302b, a rear surface 302d that extends between the top surface 302a and the bottom surface 302b and that is located opposite the chassis 302 from the front surface 302c, and a pair of side surfaces 302e and 302f that extend between the top surface 302a, the bottom surface 302b, the front surface 302c, and the rear surface 302d, and that are located opposite the chassis 302 from each other.

Furthermore, a power supply connector 304 extends from the rear surface 302d of the chassis 302 adjacent the bottom surface 302b, and is configured to connect to the AC input device sub-connector 210b on the AC input device/DC input device connector 210 discussed above with reference to FIGS. 2A and 2B. An AC power source connector 306 is included in the chassis 302 and accessible via the front surface 302c, and one of skill in the art in possession of the present disclosure will appreciate how the AC power source connector 306 may be coupled to the power supply connector 304 in order to allow the power transmission functionality discussed below. An input device release member actuator 308 is also included in the chassis 302 and configured to actuate the input device release member 211 discussed above with reference to FIG. 2B when the AC input device 300 is connected to the power supply system 200. However, while a specific AC input device 300 has been illustrated and described, one of skill in the art in possession of the present disclosure will appreciate how AC input devices may be provided according to the teachings of the present disclosure with a variety of components and/or component configurations while remaining within the scope of the present disclosure as well.

Figure 4A:
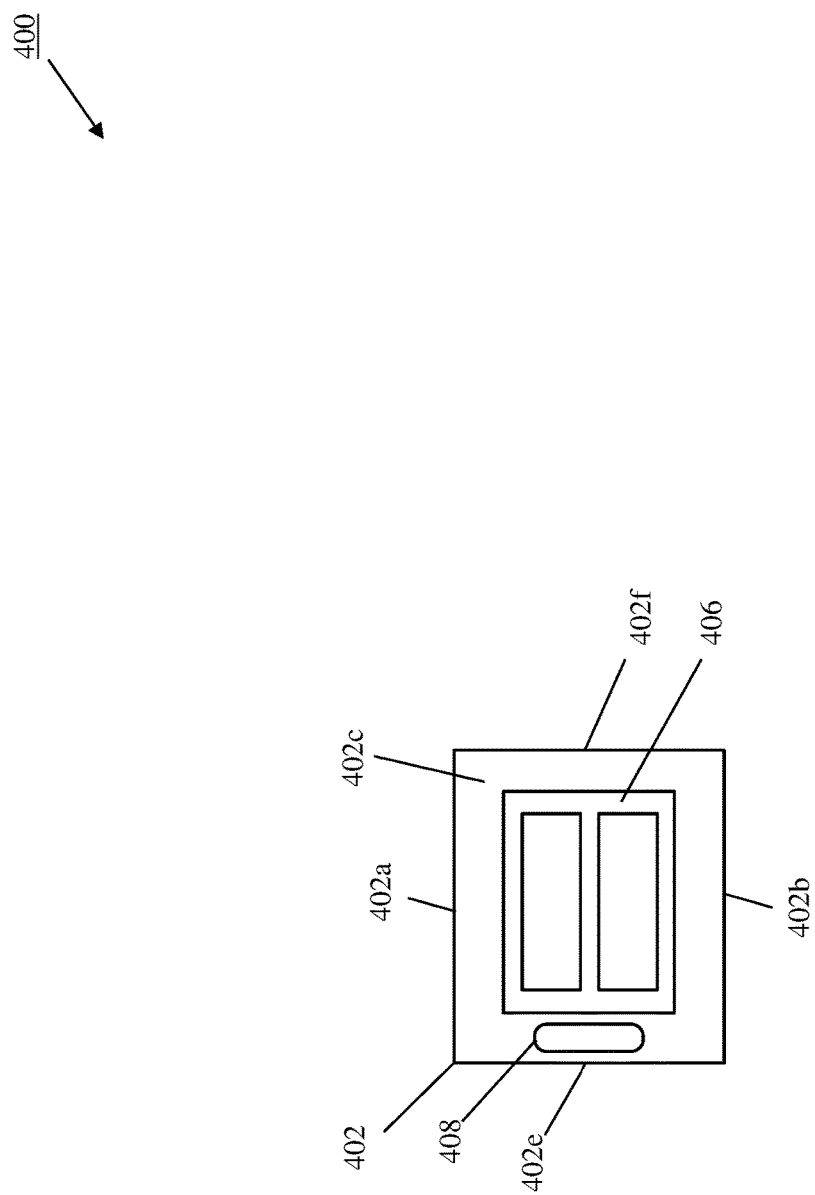
FIG. 4A is a schematic front view illustrating an embodiment of a DC input device that may be utilized with the power supply system of FIGS. 2A and 2B.
Figure 4B:
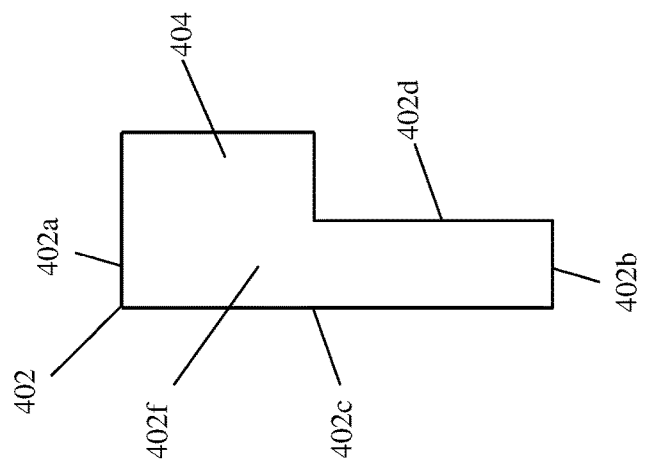
FIG. 4B is a schematic top view illustrating an embodiment of the DC input device of FIG. 4A.

With reference to FIGS. 4A and 4B, an embodiment of an DC input device 400 is illustrated that may be utilized with the power supply system 200 discussed above with reference to FIGS. 2A and 2B. In the illustrated embodiment, the DC input device 400 includes a chassis 402 that houses the components of the DC input device 400, only some of which are illustrated and discussed below. As illustrated, the chassis 402 may include a top surface 402a, a bottom surface 402b that is located opposite the chassis 402 from the top surface 402a, a front surface 402c that extends between the top surface 402a and the bottom surface 402b, a rear surface 402d that extends between the top surface 402a and the bottom surface 402b and that is located opposite the chassis 402 from the front surface 402c, and a pair of side surfaces 402e and 402f that extend between the top surface 402a, the bottom surface 402b, the front surface 402c, and the rear surface 402d, and that are located opposite the chassis 402 from each other.

Furthermore, a power supply connector 404 extends from the rear surface 402d of the chassis 402 adjacent the top surface 402b, and is configured to connect to the DC input device sub-connector 210a on the AC input device/DC input device connector 210 discussed above with reference to FIGS. 2A and 2B. A DC power source connector 406 is included in the chassis 402 and accessible via the front surface 402c, and one of skill in the art in possession of the present disclosure will appreciate how the DC power source connector 406 may be coupled to the power supply connector 404 in order to allow the power transmission functionality discussed below. An input device release member actuator 408 is also included in the chassis 402 and configured to actuate the input device release member 211 discussed above with reference to FIG. 2B when the DC input device 400 is connected to the power supply system 200. However, while a specific DC input device 400 has been illustrated and described, one of skill in the art in possession of the present disclosure will appreciate how DC input devices may be provided according to the teachings of the present disclosure with a variety of components and/or component configurations while remaining within the scope of the present disclosure as well.

Figure 5:
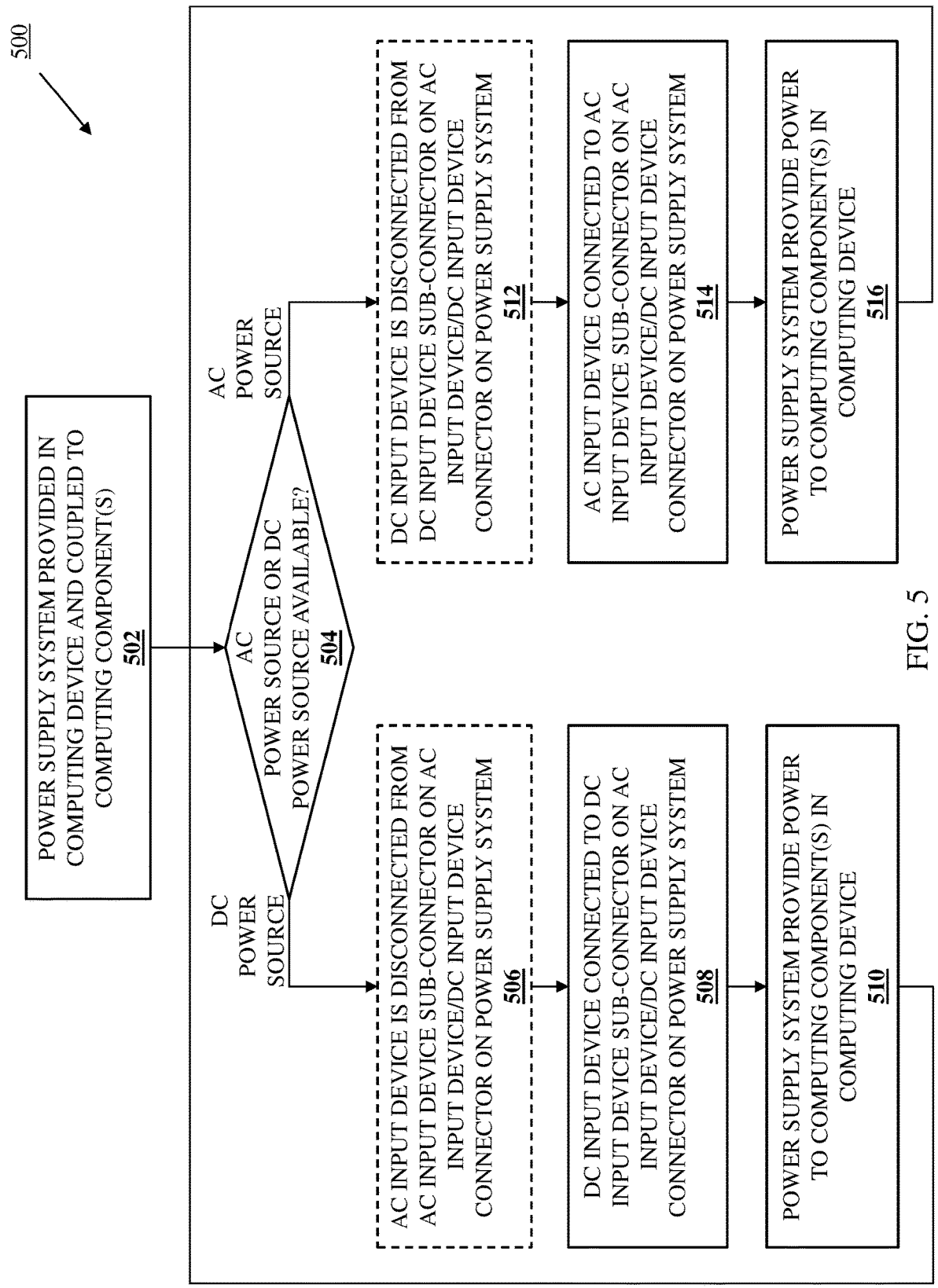
FIG. 5 is a flow chart illustrating an embodiment of a method for configuring a power supply system to provide power.

Referring now to FIG. 5, an embodiment of a method 500 for configuring a power supply system to provide power is illustrated. As discussed below, the systems and methods of the present disclosure provide for the connection of either of an AC input device or a DC input device to a power supply system in order allow for the utilization of a corresponding AC power source or DC power source that is available. For example, the power supply system of the present disclosure may include an AC input device/DC input device connector having an AC input device sub-connector and a DC input device sub-connector, an AC power supply subsystem configured to perform first power operation(s) on first power received from the AC input device sub-connector, and a DC power supply subsystem configured to perform second power operation(s) on second power received from the DC input device sub-connector. When an AC input device is coupled to the AC input device sub-connector, an AC-or-DC power supply subsystem in the power supply system performs third power operation(s) on the first power received from the AC power supply subsystem, and supplies it to component(s). When the DC input device is coupled to the DC input device sub-connector, the AC-or-DC power supply subsystem performs the third power operation(s) on the second power received from the DC power supply subsystem, and supplies it to component(s). Thus, the power supply system is configurable for use with either AC power sources or DC power sources to allow users to configure/reconfigure the power supply system for use with their available power sources, and enabling power supply system manufacturers to manufacture and stock a single type of power supply system, thus decreasing manufacturing costs and storage costs.

The specific example of the method 500 provided below presumes that the power supply system 200 is provided to a user with both the AC input device 300 and the DC input device 400, and then first utilized with a DC power source, and subsequently utilized with an AC power source. However, one of skill in the art in possession of the present disclosure will appreciate how the scenario described below is provided to describe different aspects of the functionality of the configurable AC input/DC input power supply system of the present disclosure, and may not be performed by at least some users. For example, some power supply systems (or computing devices that include those power supply systems) provided according to the teachings of the present disclosure may be provided with both the AC input device and DC input device described herein to allow users to configure that power supply system for their available power source, and some users will simply connect the AC input device or DC input device the power supply system (depending on their available AC power source or DC power source at their location), and then use that input device with the power supply system for the life of the power supply system. However, other power supply system utilization scenarios may include a user ordering the power supply system from the manufacturer with the one of the AC input device or DC input device that conforms to their available AC power source or DC power source, and thus receiving the power supply system with only that input device (which may already been connected to the power supply system by the manufacturer in such scenarios). As such, one of skill in the art in possession of the present disclosure will appreciate how the configurable AC input/DC input power supply system of the present disclosure may be utilized in a variety of manners that will fall within the scope of the present disclosure.

The method 500 begins at block 502 where a power supply system is provided in a computing device and coupled to computing component(s). With reference to FIGS. 6 and 7A, in an embodiment of block 502, a computing device 600 including a chassis 602 that houses a plurality of computing components 604a, 604b, and up to 604c may be provided, and the power supply system 200 may be provided in that chassis 602 (e.g., via any of a variety of power supply system coupling/securing features on the chassis 602 and/or the chassis 202) and coupled to the computing components 604a-604c (e.g., via a power coupling 700 connected to the device/component connector 214 on the power supply system 200) in order to configure the power supply system 200 to provide power to those computing components 604a-604c. In a specific example, the computing device 600 may be a networking device such as a switch device, with the computing components 604a-604c provided by Network Processing Units (NPUs), memory devices, storage devices, communication devices, and/or other networking components that would be apparent to one of skill in the art in possession of the present disclosure. In another example, the computing components 604a-604c may include a processing system and a memory system that include instructions that, when executed by the processing system, cause the processing system to provide a computing engine that is configured to perform any of a variety of computing operations known in the art. However, while particular computing devices and computing components are described herein, one of skill in the art in possession of the present disclosure will recognize that the computing device may be provided by other devices (e.g., server devices, storage devices, desktop computing devices, laptop/notebook computing devices, etc.), or the power supply system may be provided in other powered devices, while remaining within the scope of the present disclosure as well.

The method 500 then proceeds to decision block 504 where the method 500 proceeds depending on whether an AC power source or a DC power source is available. As will be appreciated by one of skill in the art in possession of the present disclosure, the location at which the computing device 600 is utilized may include AC power source(s) (e.g., AC power wall outlets like those provided in many modern datacenters) and/or DC power source(s) (e.g., DC power wall outlets like those provided in many TelCo central offices), and thus the power supply system 200 in the computing device 600 may be configured following decision block 504 based on the type of power available from the power source(s) at that location. In some of the specific examples below the power supply system 200 is described as initially being provided without an AC input device or DC input device connected to it (e.g., the power supply system 200 (or computing device 600 that includes that power supply system 200) may have just been received from the manufacturer), and then having one of the AC input device or DC input device connected to it, followed by possibly changing the input device in order to configure the power supply system 200 to utilized a different type of power source available at the location. However, as discussed below, the coupling of input devices to the power supply system 200 in order to configure that power supply system 200 for a particular type of power source may be performed by the manufacturer, and/or may not change over the life of the power supply system 200, while remaining within the scope of the present disclosure as well.

If, at decision block 504, a DC power source is available, the method 500 may proceed to optional block 506 where an AC input device may be disconnected from an AC input device sub-connector on an AC input device/DC input device connector on the power supply system. As discussed in further detail below, some embodiments of the method 500 may include reconfiguring the power supply system 200 from utilizing an AC power source to utilizing a DC power source, which may include the removal of the AC input device 300 from the power supply system 200 that was previously connected to it, discussed in further detail below. However, in this example, no AC input device 300 is currently connected to the power supply system 200, and thus optional block 506 may be skipped.

Figure 7B:
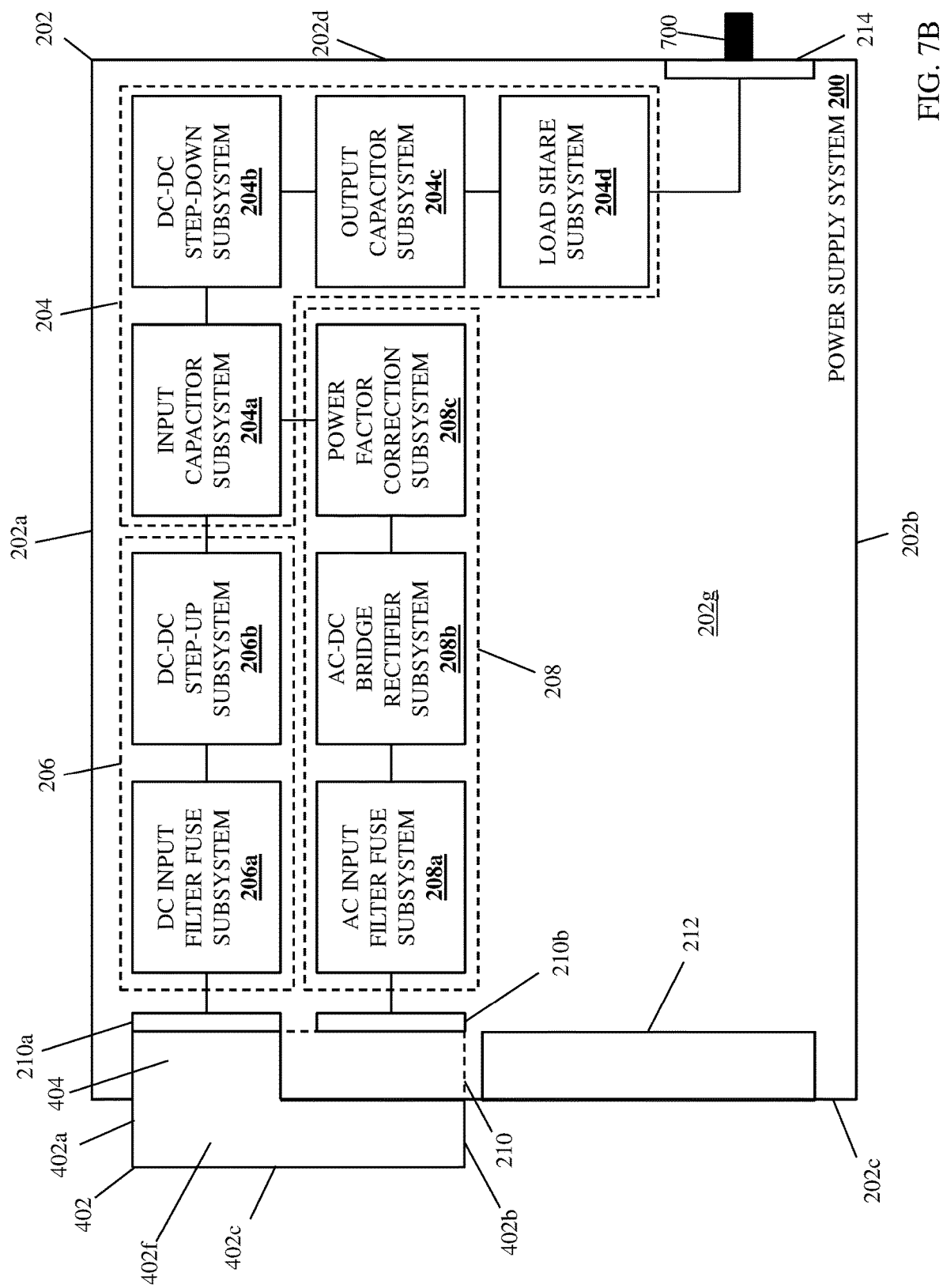
FIG. 7B is a schematic top view illustrating an embodiment of the DC input device of FIGS. 4A and 4B coupled to the power supply system of FIGS. 2A and 2B during the method of FIG. 5.
Figure 7C:
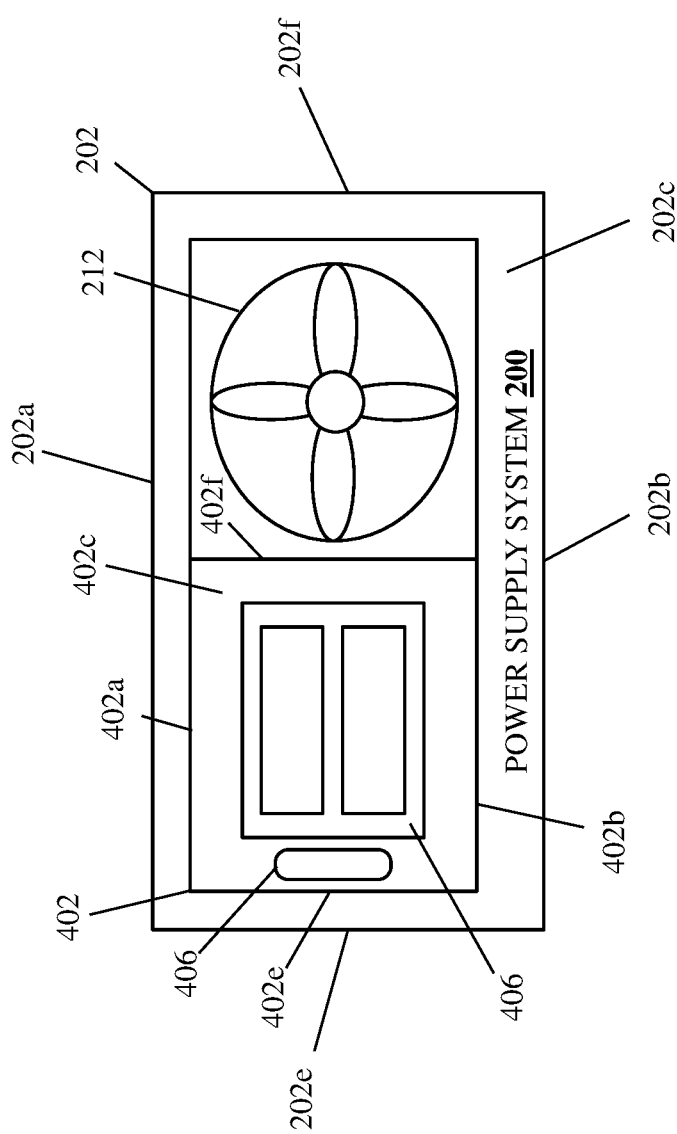
FIG. 7C is a schematic front view illustrating an embodiment of the DC input device of FIGS. 4A and 4B coupled to the power supply system of FIGS. 2A and 2B during the method of FIG. 5.

The method 500 then proceeds to block 508 where a DC input device is connected to a DC input device sub-connector on the AC input device/DC input device connector on the power supply system. With reference to FIG. 7A, in an embodiment of block 508, the DC input device 400 may be positioned adjacent the AC input device/DC input device connector 210 such that the power supply connector 404 on the DC input device 400 is aligned with the DC input device sub-connector 210a on the AC input device/DC input device connector 210. As illustrated in FIGS. 7A, 7B, and 7C, the DC input device 400 may then be moved in a direction A in order to connect the power supply connector 404 on the DC input device 400 to the DC input device sub-connector 210a on the AC input device/DC input device connector 210. As will be appreciated by one of skill in the art in possession of the present disclosure, following the connection of the DC input device 400 to the power supply system 200 as illustrated in FIGS. 7B and 7C, the power supply system 200 is configured to receive DC power from a DC power source (e.g., via a DC power wall outlet).

Figure 7D:
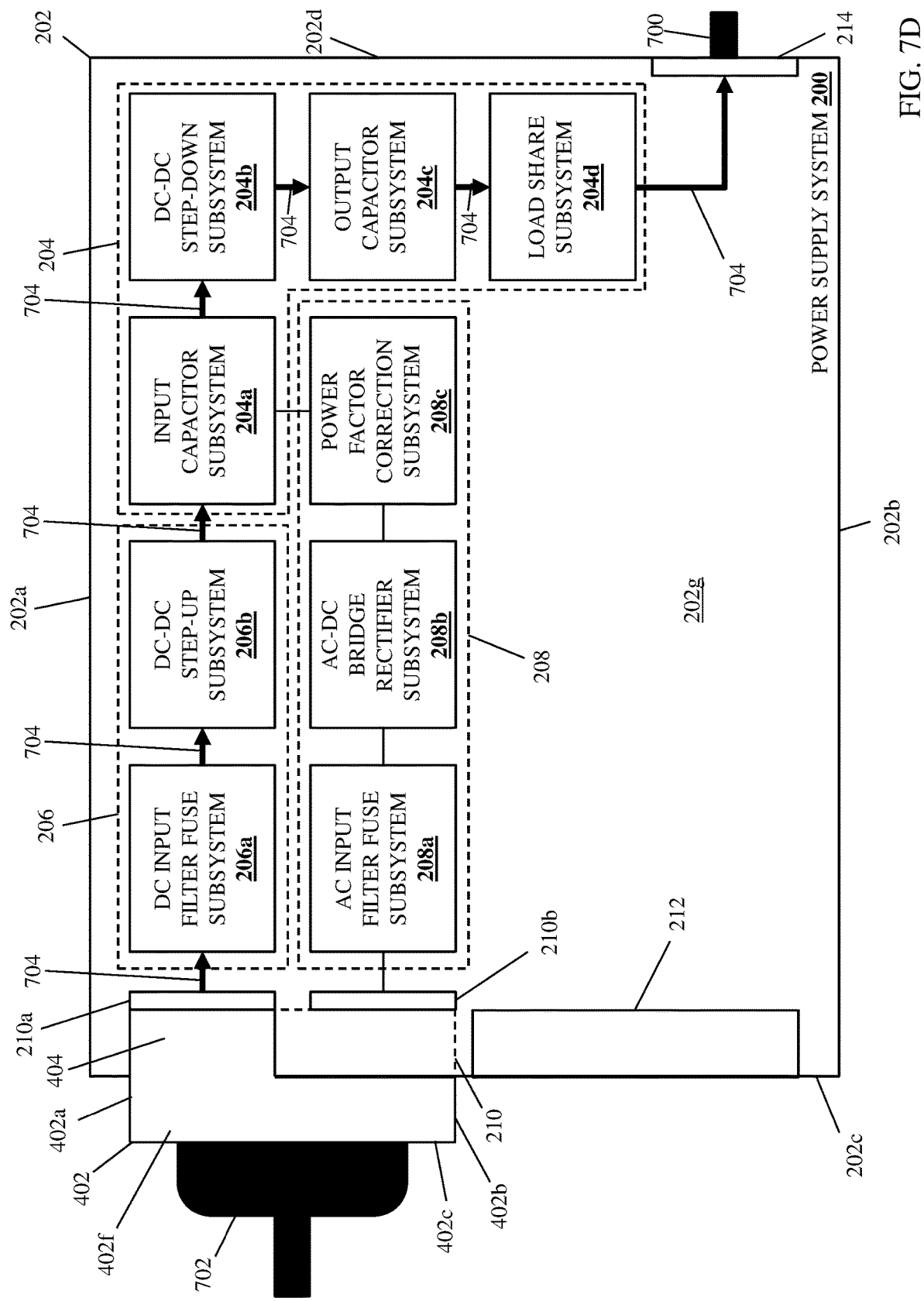
FIG. 7D is a schematic top view illustrating an embodiment of the power supply system of FIG. 7B performing power supply operations during the method of FIG. 5.

The method 500 then proceeds to block 510 where the power supply system provides power to the computing component(s) in the computing device. With reference to FIG. 7D, in an embodiment of block 510, a DC power cable 702 may be connected to each of a DC power source (not illustrated in FIG. 7D) and the DC power source connector 406 on the DC input device 400, which one of skill in the art in possession of the present disclosure will recognize will allow the power supply system 200 to perform power supply operations 704 on DC power received from the DC power source via the DC power cable 702 in order to transmit power to the computing components 604a-604c in the computing device 600 via the power coupling 700.

For example, the DC power supply subsystem 206 may perform DC power supply operations as part of the power supply operations 704 that include the DC input filter fuse subsystem 206a performing DC input filter fuse operations to prevent the DC power received via the DC input device sub-connector 210a from reaching other components of the power supply system 200 if it includes a DC voltage above a threshold, and the DC-DC step-up subsystem 206b performing DC-DC step-up operations that "step-up" or otherwise increase a DC voltage of the DC power received from the DC input filter fuse subsystem 206*a*. Furthermore, the AC-or-DC power supply subsystem 206 may perform AC-or-DC power supply operations as part of the power supply operations 704 that include the input capacitor subsystem 204*a* performing input capacitor operations that include power storage/provisioning operations on the DC power received from the DC-DC step-up subsystem 206*b*, the DC-DC step-down subsystem 204*b* performing DC voltage step-down operations that "step-down" or otherwise reduce a DC voltage of the power received from the input capacitor subsystem 204*a*, the output capacitor subsystem 204*c* performing output capacitor operations that include power storage/provisioning operations on the DC power received from the DC-DC step-down subsystem 204*b*, and the load share subsystem 204*d* performing load share operations on the DC power received from the output capacitor subsystem 204*c* in order to allow a power load (e.g., from computing device 600 and/or its computing components 604*a*-604*c*) to be shared with another power supply system. As such, one of skill in the art in possession of the present disclosure will appreciate how the power supply operations 704 performed by the power supply system 200 will operate to provide power to the computing components 604*a*-604*c* in the computing device 600.

The method 500 may then return to decision block 504. As such, the method 500 may loop as long a DC power source remains available for the power supply system 200 so that the power supply system 200 may receive DC power from that DC power source and use that DC power to power the computing component(s) in the computing device 600. For example, on a subsequent iteration of the method 500 in which the DC source remains available, optional block 506 may be skipped (i.e., because no AC input device 300 is connected to the power supply system 200), the DC input device 400 may remain connected to the power supply system 200 at block 508, and the power supply system 200 may continue providing power to the computing component(s) in the computing device 600 at block 510.

If, at decision block 504, an AC power source is available, the method 500 may proceed to optional block 512 where a DC input device may be disconnected from a DC input device sub-connector on an AC input device/DC input device connector on the power supply system. For example, at decision block 502, a user may wish to disconnect the power supply system 200 from the DC power source at the location described above and connect it to an AC power source at that location. In another example, at decision block 502, a user may wish to disconnect the power supply system 200 from the DC power source at the location described above, move the computing device 600 to a different location and connect the power supply system 200 to an AC power source at that different location. In yet another example, at decision block 502, a user may wish to disconnect the power supply system 200 from the DC power source at the location described above, remove the power supply system 200 from the computing device 600 (e.g., by disconnecting the power coupling 700 from the device/component connector 214 on the power supply system 200), provide the power supply system 200 in a different computing device at the same location or a different location and connect it to the computing components in that computing device (e.g., by connecting a power coupling in that computing device to the device/component connector 214 on the power supply system 200), and connect the power supply system 200 to an AC power source at that same location or different location. In yet another example, the power supply system 200 may be provided without an AC input device or DC input device connected to it (e.g., the power supply system 200 (or computing device 600 that includes that power supply system 200) may have just been received from the manufacturer), in which case optional block 512 may be skipped. As such, one of skill in the art in possession of the present disclosure will appreciate how the connection of the AC input device 300 to the power supply system 200 may be performed in a variety of scenarios that will fall within the scope of the present disclosure.

With reference to FIGS. 7A, 7B, 7C, and 7D, in an embodiment of optional block 512 and continuing with the example provided above in which the DC input device 400 was connected to the power supply system 200, that DC input device 400 may be disconnected from the power supply system 200. For example, the DC power cord 702 may be disconnected from the DC power source connector 406 on the DC input device 400. The DC input device 400 may then be disconnected from the power supply system 200 by, for example, activating the input device release member actuator 408 on the DC input device 400 in order to actuate the input device release member 211, which as discussed above will operate to release the DC input device 400 from the AC input device/DC input device connector 210. The DC input device 400 may then be removed from the AC input device/DC input device connector 210 (e.g., my moving the DC input device 400 relative to the AC input device/DC input device connector 210 and opposite the direction A illustrated in FIG. 7A).

Figure 8A:
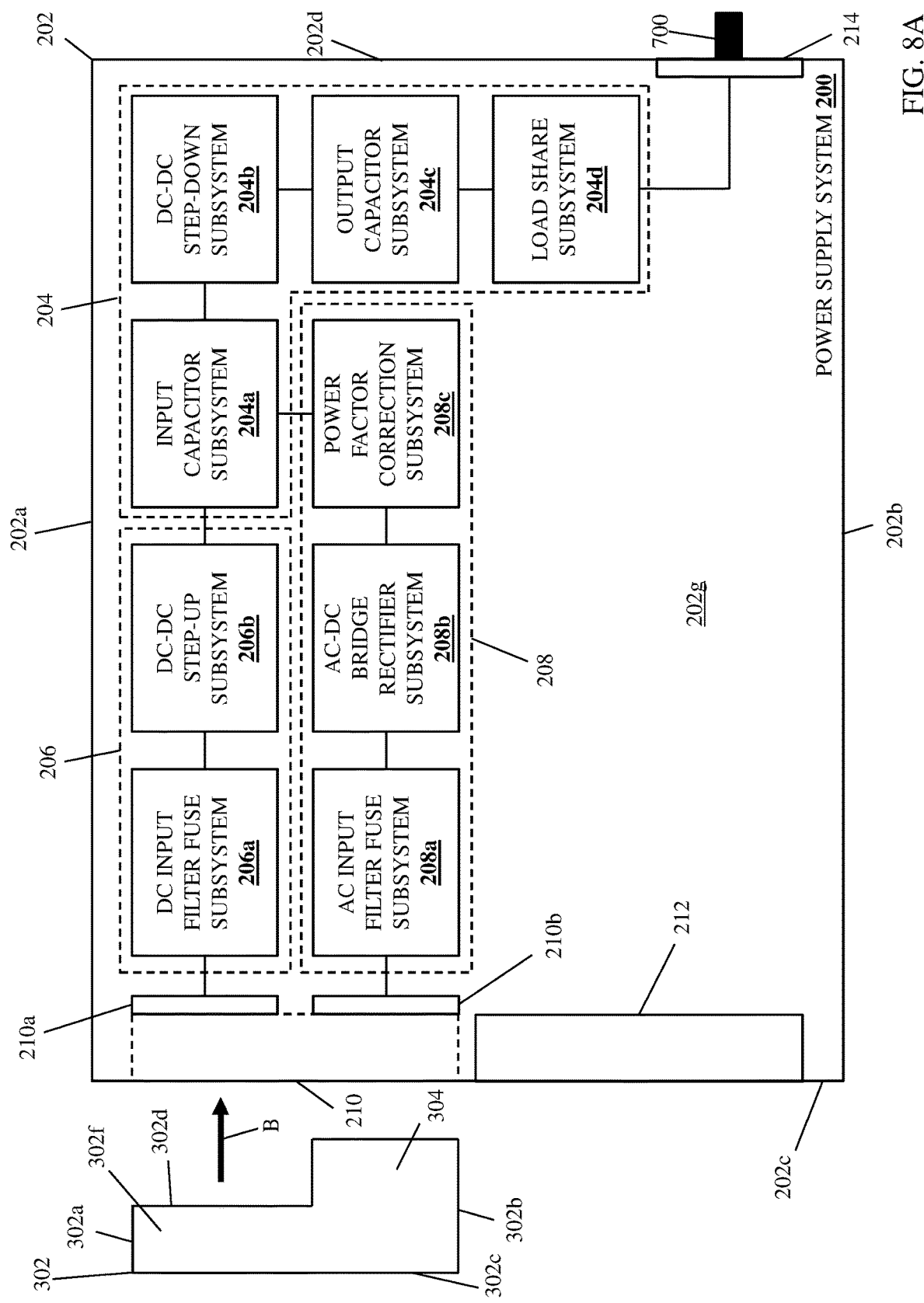
FIG. 8A is a schematic top view illustrating an embodiment of the AC input device of FIGS. 3A and 3B being coupled to the power supply system of FIGS. 2A and 2B during the method of FIG. 5.
Figure 8C:
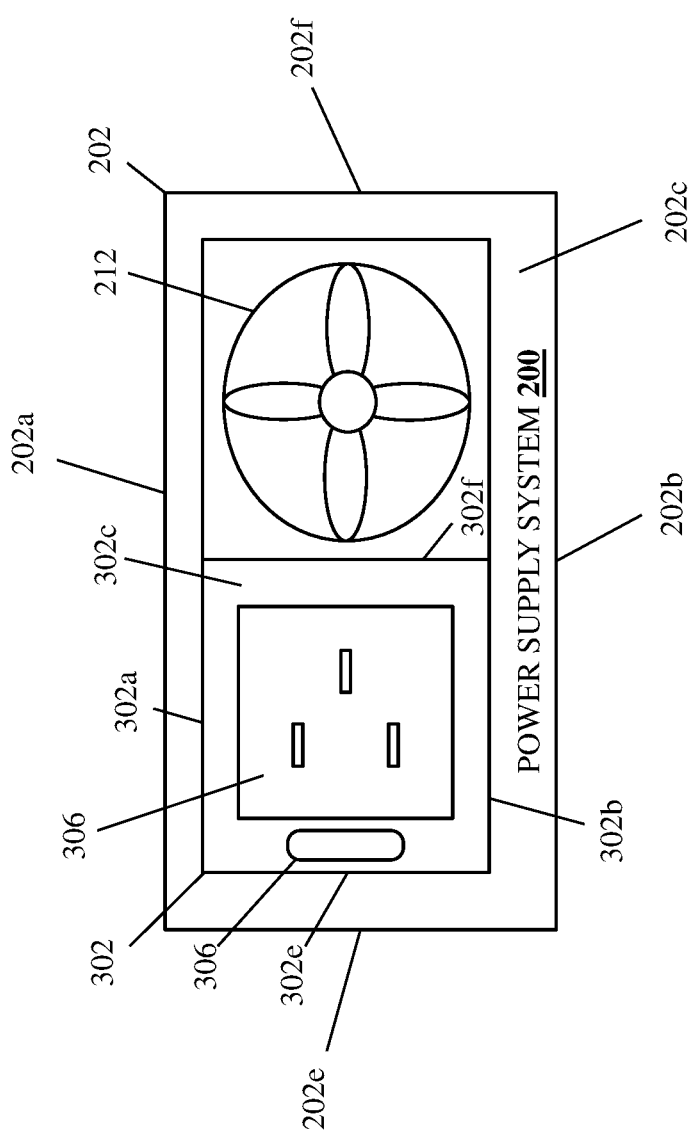
FIG. 8C is a schematic front view illustrating an embodiment of the AC input device of FIGS. 3A and 3B coupled to the power supply system of FIGS. 2A and 2B during the method of FIG. 5.

The method 500 then proceeds to block 514 where an AC input device is connected to an AC input device sub-connector on the AC input device/DC input device connector on the power supply system. With reference to FIG. 8A, in an embodiment of block 514, the AC input device 300 may be positioned adjacent the AC input device/DC input device connector 210 such that the power supply connector 304 on the AC input device 300 is aligned with the AC input device sub-connector 210*b* on the AC input device/DC input device connector 210. As illustrated in FIGS. 8A, 8B, and 8C, the AC input device 300 may then be moved in a direction B in order to connect the power supply connector 304 on the AC input device 300 to the AC input device sub-connector 210*b* on the AC input device/DC input device connector 210. As will be appreciated by one of skill in the art in possession of the present disclosure, following the connection of the AC input device 300 to the power supply system 200 as illustrated in FIGS. 8B and 8C, the power supply system 200 is configured to receive AC power from an AC power source (e.g., via an AC power wall outlet).

The method 500 then proceeds to block 516 where the power supply system provides power to the computing component(s) in the computing device. With reference to FIG. 8D, in an embodiment of block 516, an AC power cable 800 may be connected to each of an AC power source (not illustrated in FIG. 8D) and the AC power source connector 306 on the AC input device 300, which one of skill in the art in possession of the present disclosure will recognize will allow the power supply system 200 to perform power supply operations 802 on AC power received from the AC power source via the AC power cable 800 in order to transmit power to the computing components 604*a*-604*c* in the computing device 600 via the power coupling 700.

For example, the AC power supply subsystem 208 may perform AC power supply operations as part of the power supply operations 802 that include the AC input filter fuse subsystem 208*a* performing AC input filter fuse operations that prevent AC power received from the AC input device sub-connector 210*b* from reaching other components of the power supply system 200 if it includes an AC voltage above a threshold, the AC-DC bridge rectifier subsystem 208b performing AC-DC bridge rectifier operations that convert power received from the AC input filter fuse subsystem 208a and having an AC voltage to power having a DC voltage, and the power factor correction subsystem 208c performing power factor correction operations that ensure that the power output by the power factor correction subsystem 208c has a voltage and current that is in phase. Furthermore, the AC-or-DC power supply subsystem 206 may perform AC-or-DC power supply operations as part of the power supply operations 802 that include the input capacitor subsystem 204a performing power storage/provisioning operations on the DC power received from the power factor correction subsystem 206b, the DC-DC step-down subsystem 204b performing DC voltage step-down operations that "step-down" or otherwise reduce a DC voltage of the power received from the input capacitor subsystem 204a, the output capacitor subsystem 204c performing power storage/provisioning operations on the DC power received from the DC-DC step-down subsystem 204b, and the load share subsystem 204d performing load share operations on the DC power received from the output capacitor subsystem 204c in order to allow a power load (e.g., from computing device 600 and/or its computing components 604a-604c) to be shared with another power supply system. As such, one of skill in the art in possession of the present disclosure will appreciate how the power supply operations 802 performed by the power supply system 200 will operate to provide power to the computing components 604a-604c in the computing device 600.

The method 500 may then return to decision block 504. As such, the method 500 may loop as long as an AC power source remains available for the power supply system 200 so that the power supply system 200 may receive AC power from that AC power source and use that AC power to power the computing component(s) in the computing device 600. For example, on a subsequent iteration of the method 500 in which the AC source remains available, optional block 512 may be skipped (i.e., because no DC input device 400 is connected to the power supply system 200), the AC input device 300 may remain connected to the power supply system 200 at block 514, and the power supply system 200 may continue providing power to the computing component(s) in the computing device 600 at block 516.

One of skill in the art in possession of the present disclosure will appreciate how a subsequent iteration of the method 500 following the connection of the AC input device 300 to the power supply system 200 may include the disconnection of the AC input device 300 from the power supply system 200 at optional block 506 (e.g., in scenarios similar to those discussed above for disconnecting the DC input device 400 from the power supply system 200). As such, with reference to FIGS. 8A, 8B, 8C, and 8D, in an embodiment of optional block 506 and continuing with the example provided above in which the AC input device 300 was connected to the power supply system 200, that AC input device 300 may be disconnected from the power supply system 200. For example, the AC power cord 800 may be disconnected from the AC power source connector 306 on the AC input device 300. The AC input device 300 may then be disconnected from the power supply system 200 by, for example, activating the input device release member actuator 308 on the AC input device 300 in order to actuate the input device release member 211, which as discussed above will operate to release the AC input device 300 from the AC input device/DC input device connector 210. The AC input device 300 may then be removed from the AC input device/DC input device connector 210 (e.g., by moving the AC input device 300 relative to the AC input device/DC input device connector 210 and opposite the direction B illustrated in FIG. 8).

Thus, systems and methods have been described that provide for the connection of either of an AC input device or a DC input device to a PSU device in order allow for the utilization of a corresponding AC power source or DC power source that is available. For example, the PSU device of the present disclosure may include an AC input device/DC input device connector having an AC input device sub-connector and a DC input device sub-connector, an AC power supply subsystem configured to perform first power operation(s) on first power received from the AC input device sub-connector, and a DC power supply subsystem configured to perform second power operation(s) on second power received from the DC input device sub-connector. When an AC input device is coupled to the AC input device sub-connector, an AC-or-DC power supply subsystem in the PSU device performs third power operation(s) on the first power received from the AC power supply subsystem, and supplies it to component(s). When the DC input device is coupled to the DC input device sub-connector, the AC-or-DC power supply subsystem performs the third power operation(s) on the second power received from the DC power supply subsystem, and supplies it to component(s). Thus, the PSU device is configurable for use with either AC power sources or DC power sources to allow users to configure/reconfigure the PSU device for use with their available power sources, and enabling PSU device manufacturers to manufacture and stock a single type of PSU device, thus decreasing manufacturing costs and storage costs.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A switch device, comprising:
   a switch device chassis;
   a plurality of internal switch components that are housed in the switch device chassis and connected to an internal power distribution subsystem in the switch device chassis that includes a power coupling; and
   a power supply system that is secured in the switch device chassis, that is coupled to the internal power distribution subsystem via the power coupling, and that includes:
   an Alternating Current (AC) input device/Direct Current (DC) input device connector that includes an AC input device sub-connector that is configured to couple to an AC input device, and a DC input device sub-connector that is configured to couple to a DC input device;
   an AC power supply subsystem that is configured to receive AC power from the AC input device sub-connector and perform at least one AC power operation on the AC power that provides first DC power having a first DC power voltage of at least 400 volts;
   a DC power supply subsystem that is configured to receive second DC power from the DC input device sub-connector and perform at least one second DC power operation on the second DC power that provides third DC power having a third DC power voltage of at least 400 volts; and an AC-or-DC power supply subsystem that is configured to:

receive, when the AC input device is coupled to the AC input device sub-connector, the first DC power from the AC power supply subsystem having the first DC power voltage of at least 400 volts, perform at least one third DC power operation on the first DC power that includes stepping down the first DC power voltage of at least 400 volts to provide stepped-down first DC power, and supply the stepped-down first DC power via the power coupling and the internal power distribution subsystem for use in powering all of the plurality of internal switch components; and receive, when the DC input device is coupled to the DC input device sub-connector, the third DC power from the DC power supply subsystem having the third DC power voltage of at least 400 volts, perform the at least one third DC power operation on the third DC power that includes stepping down the third DC power voltage to provide stepped-down third DC power, and supply the stepped-down third DC power via the power coupling and the internal power distribution subsystem for use in powering all of the plurality of internal switch components.

2. The switch device of claim 1, wherein the AC power supply subsystem includes:

an AC input filter fuse subsystem that is coupled to the AC input device sub-connector and that is configured to perform the at least one AC power operation; and an AC-DC bridge rectifier subsystem that is coupled to the AC input filter fuse subsystem and that is configured to perform the at least one AC power operation.

3. The switch device of claim 2, wherein the AC power supply subsystem includes:

a power factor correction subsystem that is coupled to the AC-DC bridge rectifier subsystem and that is configured to perform the at least one AC power operation.

4. The switch device of claim 1, wherein the DC power supply subsystem includes:

a DC input filter fuse subsystem that is coupled to the DC input device sub-connector and that is configured to perform the at least one second DC power operation; and a DC-DC step-up subsystem that is coupled to the DC input filter fuse subsystem and that is configured to perform the at least one second DC power operation.

5. The switch device of claim 1, wherein the AC-or-DC power supply subsystem includes:

an input capacitor subsystem that is coupled to the AC power supply subsystem and the DC power supply subsystem and that is configured to perform the at least one third DC power operation;

a DC-DC step-down subsystem that is coupled to the input capacitor subsystem and that is configured to perform the at least one third DC power operation; and an output capacitor subsystem that is coupled to the DC-DC step-down subsystem and that is configured to perform the at least one third DC power operation.

6. The switch device of claim 5, wherein the AC-or-DC power supply subsystem includes:

a load share subsystem that is coupled to the output capacitor subsystem and that is configured to perform the at least one third DC power operation.

7. The switch device of claim 1, further comprising:

the AC input device; and the DC input device.

8. A computing device, comprising: a computing device chassis; a processing system that is housed in the computing device chassis and that is connected to an internal power distribution subsystem in the computing device chassis that includes a power coupling; a memory system that is housed in the computing device chassis, that is coupled to the processing system, that is connected to the internal power distribution subsystem in the computing device chassis that includes the power coupling, and that includes instructions that, when executed by the processing system, cause the processing system to provide computing engine; and a power supply system that is secured in the computing device chassis and that is coupled to the internal power distribution subsystem via the power coupling, wherein the power supply system includes: an Alternating Current (AC) input device/Direct Current (DC) input device connector that includes an AC input device sub-connector that is configured to couple to an AC input device, and a DC input device sub-connector that is configured to couple to a DC input device; an AC power supply subsystem that is configured to receive AC power from the AC input device sub-connector and perform at least one AC power operation on the AC power that provides first DC power having a first DC power voltage of at least 400 volts; a DC power supply subsystem that is configured to receive second DC power from the DC input device sub-connector and perform at least one second DC power operation on the second DC power that provides third DC power having a third DC power voltage of at least 400 volts; and an AC-or-DC power supply subsystem that is configured to: receive, when the AC input device is coupled to the AC input device sub-connector, the first DC power from the AC power supply subsystem having the first DC power voltage of at least 400 volts, perform at least one third DC power operation on the first DC power that includes stepping down the first DC power voltage of at least 400 volts to provide stepped-down first DC power, and supply the stepped-down first DC power via the power coupling and the internal power distribution subsystem for use in powering the processing system and the memory system; and receive, when the DC input device is coupled to the DC input device sub-connector, the third DC power from the DC power supply subsystem having the third DC power voltage of at least 400 volts, perform the at least one third DC power operation on the third DC power that includes stepping down the third DC power voltage to provide stepped-down third DC power, and supply the stepped-down third DC power via the power coupling and the internal power distribution subsystem for use in powering the processing system and the memory system.

9. The computing device of claim 8, wherein the AC power supply subsystem includes:

an AC input filter fuse subsystem that is coupled to the AC input device sub-connector and that is configured to perform the at least one AC power operation; and an AC-DC bridge rectifier subsystem that is coupled to the AC input filter fuse subsystem and that is configured to perform the at least one AC power operation.

10. The computing device of claim 9, wherein the AC power supply subsystem includes:

a power factor correction subsystem that is coupled to the AC-DC bridge rectifier subsystem and that is configured to perform the at least one AC power operation.

11. The computing device of claim 8, wherein the DC power supply subsystem includes:
   a DC input filter fuse subsystem that is coupled to the DC input device sub-connector and that is configured to perform the at least one second DC power operation; and
   a DC-DC step-up subsystem that is coupled to the DC input filter fuse subsystem and that is configured to perform the at least one second DC power operation.

12. The computing device of claim 8, wherein the AC-or-DC power supply subsystem includes:
   an input capacitor subsystem that is coupled to the AC power supply subsystem and the DC power supply subsystem and that is configured to perform the at least one third DC power operation;
   a DC-DC step-down subsystem that is coupled to the input capacitor subsystem and that is configured to perform the at least one third DC power operation; and
   an output capacitor subsystem that is coupled to the DC-DC step-down subsystem and that is configured to perform the at least one third DC power operation.

13. The computing device of claim 12, wherein the AC-or-DC power supply subsystem includes:
   a load share subsystem that is coupled to the output capacitor subsystem and that is configured to perform the at least one third DC power operation.

14. A method for configuring a power supply system to provide power, comprising:
   disconnecting, by an Alternating Current (AC) input device sub-connector included on an AC input device/Direct Current (DC) input device connector on a power supply system that is secured in a computing device chassis and that is coupled via a power coupling to an internal power distribution subsystem in the computing device chassis that is connected to a plurality of internal computing device components that are housed in the computing device chassis, from an AC input device;
   connecting, by a DC input device sub-connector included on the AC input device/DC input device connector, to a DC input device;
   receiving, by a DC power supply subsystem that is included in the power supply system and via the DC input device and the DC input device sub-connector, first DC power;
   performing, by the DC power supply subsystem, at least one first DC power operation on the first DC power that provides second DC power having a second DC power voltage of at least 400 volts;
   receiving, by an AC-or-DC power supply subsystem included in the power supply system, the second DC power from the DC power supply subsystem having the second DC power voltage of at least 400 volts;
   performing, by the AC-or-DC power supply subsystem, at least one second DC power operation on the second DC power that includes stepping down the second DC power voltage of at least 400 volts to provide stepped-down second DC power; and
   supplying, by the AC-or-DC power supply subsystem, the stepped-down second DC power via the power coupling and the internal power distribution subsystem for use in powering all of the plurality of internal computing device components that are housed in the computing device chassis.

15. The method of claim 14, wherein the DC power supply subsystem includes:
   a DC input filter fuse subsystem that is coupled to the DC input device sub-connector and that is configured to perform the at least one first DC power operation; and
   a DC-DC step-up subsystem that is coupled to the DC input filter fuse subsystem and that is configured to perform the at least one first DC power operation.

16. The method of claim 14, wherein the AC-or-DC power supply subsystem includes:
   an input capacitor subsystem that is coupled to the AC power supply subsystem and the DC power supply subsystem and that is configured to perform the at least one second DC power operation;
   a DC-DC step-down subsystem that is coupled to the input capacitor subsystem and that is configured to perform the at least one second DC power operation; and
   an output capacitor subsystem that is coupled to the DC-DC step-down subsystem and that is configured to perform the at least one second DC power operation.

17. The method of claim 14, wherein the AC-or-DC power supply subsystem includes:
   a load share subsystem that is coupled to the output capacitor subsystem and that is configured to perform the at least one second DC power operation.

18. The method of claim 14, further comprising:
   connecting, by the AC input device sub-connector included on the AC input device/DC input device connector, to the AC input device;
   receiving, by an AC power supply subsystem that is included in the power supply system and via the AC input device and the AC input device sub-connector, AC power;
   performing, by the AC power supply subsystem, at least one AC power operation on the AC power that provides third DC power having a third DC power voltage of at least 400 volts;
   receiving, by the AC-or-DC power supply subsystem, the third DC power from the AC power supply subsystem;
   performing, by the AC-or-DC power supply subsystem, at least one second DC power operation on the second DC power that includes stepping down the second DC power voltage of at least 400 volts to provide stepped-down second DC power; and
   supplying, by the AC-or-DC power supply subsystem, the stepped-down second DC power via the power coupling and the internal power distribution subsystem for use in powering all of the plurality of internal computing device components that are housed in the computing device chassis;
   performing, by the AC-or-DC power supply subsystem, the at least one second DC power operation on the third DC power that includes stepping down the third DC power voltage of at least 400 volts to provide stepped-down third DC power; and
   supplying, by the AC-or-DC power supply subsystem, the stepped-down third DC power via the power coupling and the internal power distribution subsystem for use in powering all of the plurality of computing device components that are housed in the computing device chassis.

19. The method of claim 18, wherein the AC power supply subsystem includes:
   an AC input filter fuse subsystem that is coupled to the AC input device sub-connector and that is configured to perform the at least one AC power operation; and an AC-DC bridge rectifier subsystem that is coupled to the AC input filter fuse subsystem and that is configured to perform the at least one AC power operation.

20. The method of claim 14, wherein the AC power supply subsystem includes:
a power factor correction subsystem that is coupled to the AC-DC bridge rectifier subsystem and that is configured to perform the at least one AC power operation.

\* \* \* \* \*